United States Patent [19]

Halen, Jr.

[11] Patent Number: 5,069,490
[45] Date of Patent: Dec. 3, 1991

[54] PIPE COUPLING WITH SPRING OFF-SET

[75] Inventor: Richard M. Halen, Jr., Pittsburgh, Pa.

[73] Assignee: Coupling Systems, Incorporated, Pittsburgh, Pa.

[21] Appl. No.: 418,122

[22] Filed: Oct. 6, 1989

[51] Int. Cl.[5] ............... F16L 17/00; F16L 19/00; F16L 21/02
[52] U.S. Cl. ............................. 285/337; 285/348
[58] Field of Search ............ 285/267, 279, 337, 348, 285/413, 375; 411/231

[56] References Cited

U.S. PATENT DOCUMENTS

| | | |
|---|---|---|
| 607,180 | 7/1898 | Landis . |
| 884,749 | 4/1908 | Mason . |
| 1,804,856 | 5/1931 | Boutry . |
| 2,041,543 | 5/1936 | Guarnaschelli . |
| 2,247,032 | 6/1941 | Norton . |
| 2,363,586 | 11/1944 | Guarnaschelli . |
| 2,437,632 | 3/1948 | Wolfram . |
| 2,490,686 | 12/1949 | Guarnaschelli . |
| 2,733,939 | 2/1956 | Scherer . |
| 3,030,996 | 4/1962 | Doerr ............... 411/231 |
| 4,070,046 | 1/1978 | Felker et al. ............ 285/337 |
| 4,569,542 | 2/1986 | Anderson et al. ........ 285/337 |
| 4,606,565 | 8/1986 | Royston ............ 285/337 |
| 4,878,697 | 11/1989 | Henry ............ 285/348 |

FOREIGN PATENT DOCUMENTS 653721 6/1929 France .

Primary Examiner—Neill R. Wilson
Attorney, Agent, or Firm—Thomas R. Shaffer

[57] ABSTRACT

A coupling for pipes is disclosed which includes a central elongate sleeve into which two pipe ends to be joined are placed, a pair of annular gasket members positioned within the opposite sleeve ends, a pair of annular backup rings positioned longitudinally outwardly of the gasket members, a pair of annular wave springs positioned longitudinally outwardly of the backup rings, a pair of collapsible split ring annular gripping members positioned longitudinally outwardly of the backup rings, a pair of follower members positioned longitudinally outwardly from the wave springs and gripping members, and bolts and nuts engaging the follower to urge the follower members relatively closer together. As force is applied, inward motion of the follower members initially causes partial gasket compression, thereafter causes the wave springs to compress and the backup rings to contact and collapse the gripping members. The compressed wave springs store energy to reduce torque loss caused by stress relaxation of the pipes or gasket members.

15 Claims, 5 Drawing Sheets

PIPE COUPLING WITH SPRING OFF-SET

BACKGROUND OF THE INVENTION

1. Field of the Invention

This invention relates to a pipe coupling and seal More specifically, it relates to a pipe coupling which incorporates a spring member to control the timing of the gripping and sealing of opposite pipe ends to be connected and further reduces torque loss caused by stress relaxation of the pipes or sealing gaskets.

2. Description of the Art

The technology of sealing and gripping two plain-end pipes with a bolted coupling is known in the prior art. See for example U.S. Pat. Nos. 4,070,046; 4,606,565; and 4,569,542; all of which are currently being utilized for this purpose.

U.S. Pat. No. 4,070,046 discloses pipe coupling for both restraining and sealing the pipe ends. One major disadvantage of this design results from the timing as to when the gripping and sealing members are actuated Because the gripping members engage the pipe ends at very low torque, the follower member becomes locked onto the pipe end with this design. Accordingly, proper gasket compression can only be achieved by insuring that there is a gap between the pipe ends and insuring that at least one of the pipes is free to move axially into the coupling These requirements make this design unsuitable for use in certain applications where such pipe movement is not possible Another problem with this design is that gasket compression may be reduced when the coupled pipe is under an axial tension load because the gripping member which supports the gasket has a tendency to move away from the gasket U.S. Pat. No. 4,569,542 discloses a device which provides partial control of the timing of the gripping and sealing functions of a pipe coupling by providing a gasket member having a rib thereon designed to offset the gasket from the gripping member when in a relaxed state Referring to FIG. 3 of U.S. Pat. No. 4,569,542, such coupling utilizes an extension 40 on the sealing member to create a space Y below the seal This space is utilized as a timing mechanism so that the sealing system is substantially activated prior to the gripping system. Bolt tightening during installation initially causes compression of the rib (and thus the gasket) prior to engaging the gripping member. Additional tightening locks the follower onto the pipe end, but presumably not until the gasket is sufficiently compressed.

The use of the gasket member in U.S. Pat. No. 4,569,542 to provide a desired sequence of the sealing and gripping functions of the coupling causes varying and unreliable results. First, the behavior of the compressibility of the gasket rib necessarily depends upon the hardness of the rubber, the temperature, and the physical dimensions of the rib, all of which are difficult to control. The result is that varying installations will have different degrees of sealing and gripping pressures. Secondly, after the installation of such a coupling, the extension of the gasket will be highly stressed and being rubber, will relax by some degree over time This relaxation is identified by a lowering of bolt torque values over time. Such a reduction of torque values will be greater where one or more of the pipes to be joined is plastic because plastic pipes will also suffer from stress relaxation over time Finally, with this design, it does not appear to be possible to provide a specific desired degree of gasket compression and gripping member load because the former is still dependant upon the later Another partial solution to these problems have been proposed in U.S. Pat. No. 4,606,565 in which separate follower members are provided for the gripping and sealing members. With such a coupling, complete and repeatable gasket compression as well as complete and repeatable gripping engagement are possible regardless of installation conditions. While such a coupling solves the problems of gasket compression and gripping engagement, the design requires assembly of a number of pieces and proper tightening of twice as many bolts. Accordingly, U.S. Pat. No. 4,606,565 overcomes the limitations of the other designs, but, in so doing, increases the number of pieces and causes the installation of the device onto the pipe to be somewhat cumbersome and overly time consuming.

There remains, therefore, a need for an improved pipe coupling which provides a desired degree of sealing and gripping functions regardless of installation conditions There remains a need for such a coupling which is simple to install and manufacture. There still further remains a need for such a coupling which retains an appropriate seal over time

SUMMARY OF THE INVENTION

The present invention provides a pipe coupling for the joining together of two pipe ends of either common or dissimilar materials. The coupling provides a seal against internal pressure and a restraint against longitudinal movement of the pipes.

The coupling described herein provides the same ease of installation as that described in U.S. Pat. No. 4,569,542 but also provides superior results in terms of the long term performance of the coupling.

According to the present invention a coupling for pipes is provided which includes a central elongate sleeve having opposite flared ends, and adapted to receive coaxially two opposite pipe ends to be connected: a pair of annular gasket members positioned within said opposite sleeve ends, said gasket members having longitudinal innermost gasket ends adapted to be received by the flared ends of said central sleeve and said gasket members having a longitudinal outermost end; a pair of annular backup rings positioned longitudinally outwardly of said gasket members; a pair of annular wave springs positioned longitudinally outwardly of said backup rings, said wave springs having a longitudinal innermost surface and a longitudinal outermost surface; a pair of collapsible split ring annular gripping members positioned longitudinally outwardly of said backup rings, said gripping members having gripping teeth on a circumferential inside surface thereof, said teeth adapted to engage said pipe ends when said gripping members are collapsed; a pair of follower members positioned longitudinally outwardly of said wave springs and gripping members, said follower members having longitudinal outer flange portions having substantially flat inner bearing surfaces; and tightening means engaging said follower members for providing inward force on said follower members to urge said follower members relatively closer together and toward a longitudinal midpoint of said sleeve whereby, as force is applied, inward motion of the follower members initially causes partial gasket compression, thereafter causes said wave springs to compress and said backup rings to contact and collapse said gripping members and said gripping teeth to engage said pipe ends, whereby said compressed wave springs store energy to reduce torque loss of said tightening means caused by stress relaxation of said pipes or said gaskets.

Preferably the flared ends of the sleeve have a frusto-conical configuration and slope outwardly away from a circumferential centerline of said sleeve when moving longitudinally outwardly from said longitudinal midpoint of the sleeve. Further, the innermost gasket ends are preferably frusto-conical and have circumferential outer surfaces which slope outwardly away from a circumferential centerline of said sleeve when moving outwardly from a longitudinal midpoint of the sleeve.

The innermost gasket ends preferably have a V-shaped groove sized and positioned to receive and engage an outermost rim of said central sleeve. Further, the gasket members preferably have substantially flat longitudinal outermost ends.

The backup rings of the present invention preferably have substantially flat longitudinal innermost ends and substantially flat longitudinal outermost ends and the longitudinal innermost ends of said backup rings are preferably positioned adjacent to and in contact with the outermost ends of said gasket members. The longitudinal outermost ends of said backup rings preferably have a circumferential width including a circumferential outer portion and circumferential inner portion.

The wave springs of the present invention preferably have a circumferential width less than the circumferential width of said backup rings. Further, at least a portion of said innermost surfaces of said wave springs are preferably positioned adjacent to and in contact with said circumferential outer portions of said outermost ends of said backup rings. Still further, in the preferred embodiment of the present invention the wave springs have substantially sinusoidal innermost and outermost surfaces.

The gripping members of the present invention preferably have longitudinal inward ends initially spaced from and facing said circumferential inner portions of said outermost ends of said backup rings. Preferably, the gripping members have frusto-conical circumferential outer sides which slope inwardly toward a circumferential center line of said sleeve when moving outwardly from the longitudinal midpoint the sleeve.

The follower members of the present invention preferably have longitudinal outer flange portions having substantially flat inner bearing surfaces. The inner bearing surfaces of the flange portions are in at least partial contact with outermost surfaces of said wave springs. The flange portions of said follower members preferably also have a frusto-conical opening therethrough positioned circumferentially inwardly of said inner bearing surfaces which slope inwardly toward a circumferential center line of the sleeve when moving outwardly from a longitudinal midpoint of the sleeve. The flange portions also preferably have bore holes therein into which a pair of bolts are provided. A pair of nuts are threaded on said bolts whereby tightening said bolts urges said follower members relatively closer together.

DETAILED DESCRIPTION OF THE PREFERRED EMBODIMENTS

Figure 1:
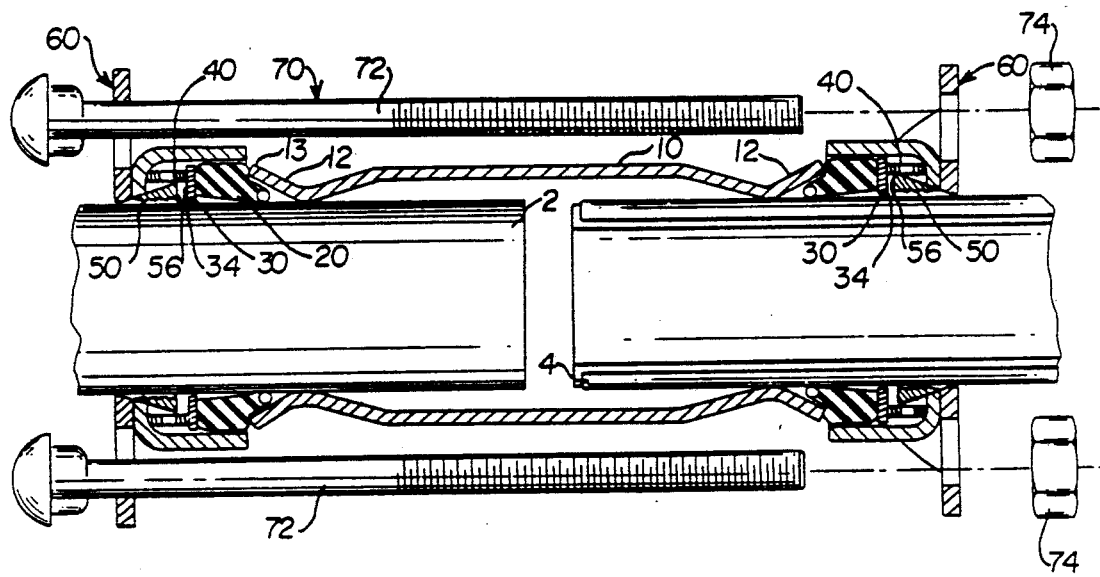
FIG. 1 is a cross sectional view of the coupling of the present invention in an initial relaxed position.
Figure 2:
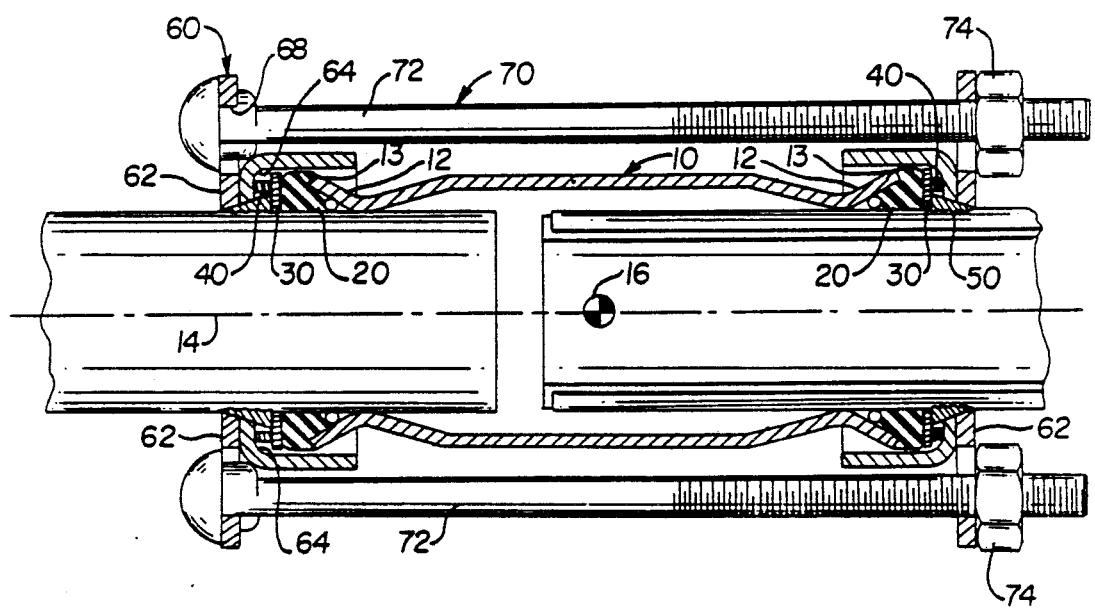
FIG. 2 is a cross sectional view of the coupling of the present invention showing the components in a fully tightened position.

Referring to the Figures, the present invention includes a central elongate sleeve 10, a pair of annular gasket members 20, a pair of annular back-up rings 30, a pair of annular wave springs 40, a pair of collapsible split ring annular gripping members 50, a pair of annular follower members 60 and tightening means 70. Referring to FIGS. 1 and 2, a central elongate sleeve 10 formed of steel is provided. Sleeve 10 has opposite flared ends 12. As shown in FIG. 2, sleeve 12 has a circumferential center line designated by chain line 14 and a longitudinal midpoint designated as point 16. Flared ends 12 have a frusto-conical configuration and slope outwardly from the circumferential center line 14 when moving longitudinally outward from the longitudinal midpoint 16. Central elongate sleeve 10 is adapted to receive coaxially two opposite pipe ends 2 and 4 to be connected. It is noted that the coupling of the present invention may be utilized to connect one steel pipe to another steel pipe, one steel pipe to a plastic pipe or one plastic pipe to another plastic pipe.

Figure 3:
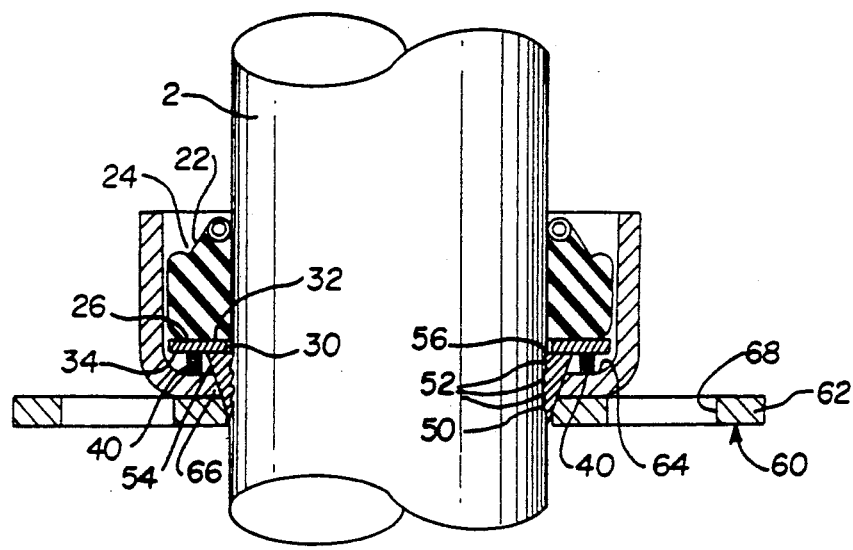
FIG. 3 is an enlarged cross sectional view showing a follower member, a split ring gripping member, a wave spring member, a back-up ring and a gasket member of the present invention.
Figure 4:
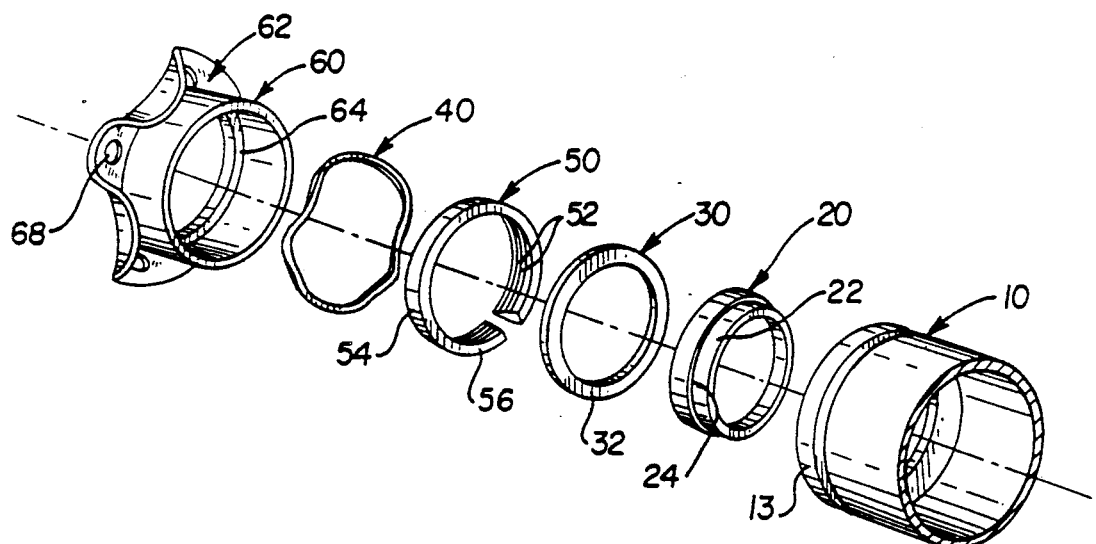
FIG. 4 is an isometric exploded view of one end of the coupling of the invention.

Referring to FIGS. 1-4, gasket members 20 of the present invention are formed of rubber and ar positioned within the opposite sleeve ends. Each gasket member 20 has a longitudinally innermost gasket end 22 adapted to be received by the flared end 12 of central sleeve 10 and each member further has a longitudinally outermost end 26. Referring to FIGS. 2 and 3, the innermost gasket ends 22 are frusto-conical and slope generally outwardly from the circumferential centerline 14 of sleeve 10 when moving outwardly from longitudinal midpoint 16 thereof. Further, innermost gasket ends 22 are preferably provided with a V-shaped groove 24 sized and positioned to receive and engage an outermost rim 13 of sleeve 10 (FIG. 2). The outermost longitudinal ends 26 of gasket members 20 are substantially flat.

A pair of annular back-up rings 40 are positioned longitudinally outwardly of said gasket members 20. Back-up rings 40 preferably have a substantially flat longitudinal innermost end 32 and a substantially flat longitudinal outermost end 34. The longitudinal innermost ends 32 of back-up rings 30 are positioned adjacent to and in contact with the outermost ends 26 of gasket members 20.

Figure 8:
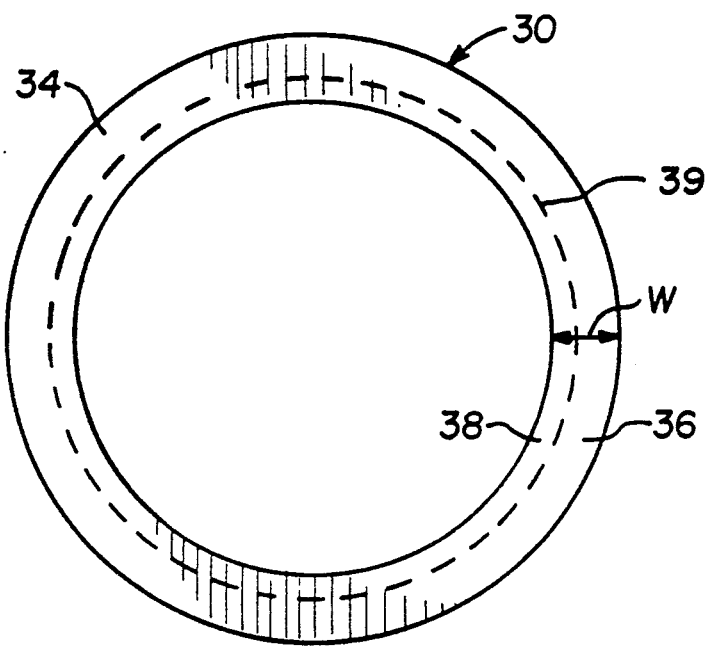
FIG. 8 is a top plan view of a back-up ring according to the present invention having a circumferential outer portion and circumferential inner portion divided by a dotted line.

Referring to FIG. 8, the outermost end 34 of back-up ring 30 has a circumferential width W including a circumferential outer portion 36 and a circumferential inner portion 38 divided by dotted line 39.

Figure 5:
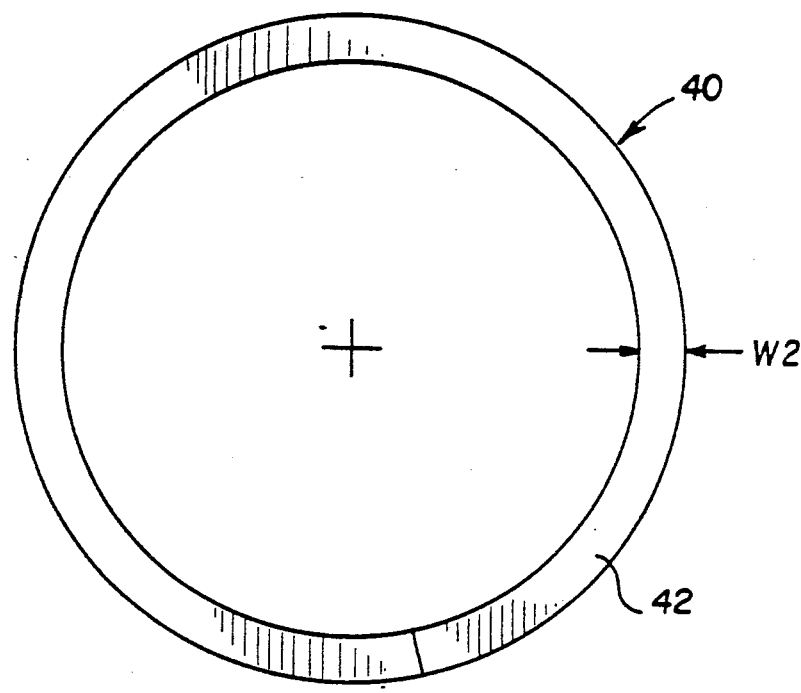
FIG. 5 is a top view of the wave spring of the present invention.
Figure 6:
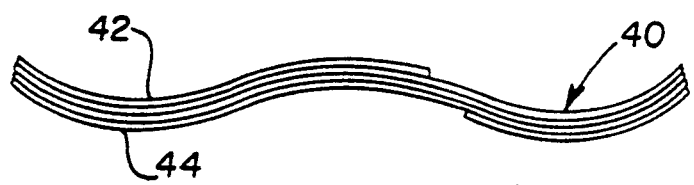
FIG. 6 is a side elevational view of the wave spring of FIG. 4.
Figure 7:
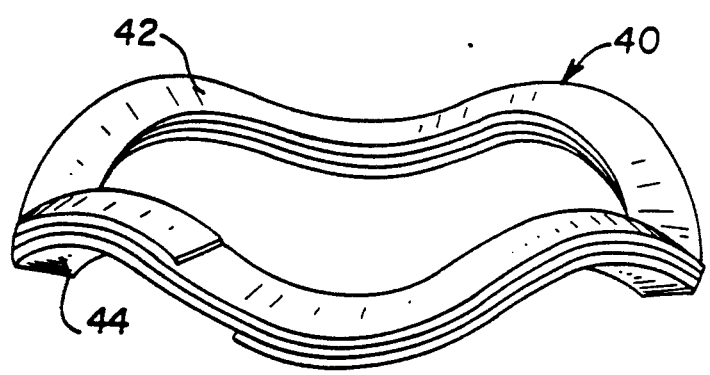
FIG. 7 is an isometric view of the wave spring of the present invention.

The wave spring 40 of the present invention as best shown in FIGS. 5–7 is preferably formed from a single strip of carbon hardened steel and is formed into an annular multi-layered form. The wave springs 40 have a circumferential width W2 which is less than the circumferential width W of back-up rings 30. The annular wave springs 40 are positioned longitudinally outward of said back-up rings 30 and said wave springs 40 each have a longitudinal innermost surface 42 and a longitudinal outermost surface 44. At least a portion of said innermost surfaces 42 are positioned adjacent to and in contact with the circumferential outer portions 36 of the outermost ends 34 of said back-up rings 30. Wave springs 30 further have a substantially sinusoidal innermost surface 42 and outermost surface 44 as best shown in FIGS. 6 and 7.

Figure 9:
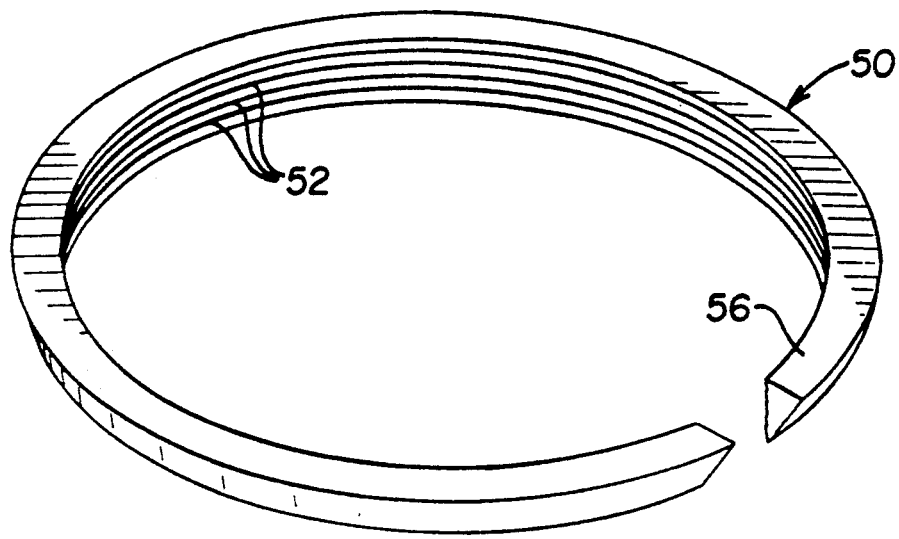
FIG. 9 is an isometric view of a collapsible split ring annular gripping member according to the present invention.

A pair of collapsible split ring annular gripping members 50 (FIG. 9) are positioned longitudinally outwardly of said backup rings 30. The gripping members 50 have gripping teeth 52 on a circumferential inside surface thereof. Teeth 52 are adapted to engage pipe ends 2 and 4 when said gripping members 50 are collapsed. Gripping members 50 further have frusto-conical circumferential outer sides 54 which slope inwardly towards circumferential center line 14 of said sleeve 10 when moving outwardly from the longitudinal midpoint 16 of sleeve 10.

As best shown in FIG. 1, inward ends 56 of said gripping members 50 are initially spaced from and face the circumferential inner portions 38 of the outermost ends 34 of said backup rings 30.

A pair of follower members 60 (FIGS. 1–4) are positioned longitudinally outwardly of said wave springs 40 and said gripping members 50. The follower members 60 have longitudinal outer flange portions 62 which provide substantially flat inner bearing surfaces 64. The inner bearing surfaces 64 of follower members 60 are in at least partial contact with the outermost surfaces 44 of said wave springs 40. The flange portions 62 of follower members 60 have a frusto-conical opening 66 therethrough positioned circumferentially inwardly of said inner bearing surfaces 64. The frusto-conical openings 66 slope inwardly towards the circumferential centerline 14 of the sleeve 10 when moving outwardly from a longitudinal point 16 of sleeve 10.

The tightening means 70 of the present invention engages the follower members 60 for providing inward force on the follower members 60 to urge the follower member 60 relatively closer together and towards the longitudinal midpoint 16 of the sleeve. As shown in FIGS. 1 and 2, tightening means 70 includes a pair of bolts 72 which extend through openings 68 in outer flange portions 62 of follower members 60 and an inward force is created by tightening nuts 74 onto said bolts 72.

Figure 7A:
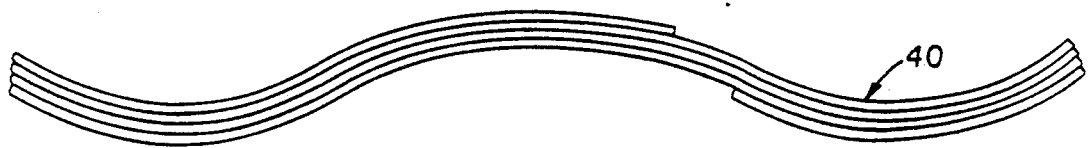
FIG. 7a is a side elevational view of the wave spring of FIG. 5 showing said spring in a relaxed condition.

In operation, wave springs 40 in their relaxed condition (FIG. 7a) initially provide a space between annular backup rings 30 and the inner bearing surfaces 64 of follower members 60. In this relaxed condition of wave spring 40, as shown in FIG. 1, backup rings 30 are initially spaced from the innermost end 56 of the collapsible split ring annular gripping members 50.

Figure 7B:
FIG. 7b is a side elevational view of the wave spring of FIG. 5 showing the wave spring in a partially compressed condition.
Figure 7C:
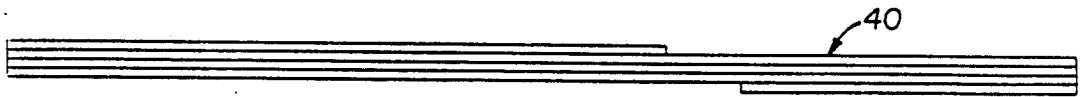
FIG. 7c is a side elevational view of the wave spring of FIG. 5 showing the wave spring in a totally compressed condition.

As nuts 74 are tightened onto bolts 72, the follower members 60 are thereby urged relatively closer together toward the longitudinal midpoint 16 of the sleeve whereby such inward motion of the follower members initially causes partial gasket compression of gaskets 20. Tightening of nuts 74 also causes a partial compression of the wave spring 40 as shown in FIG. 7b reducing the distance between backup rings 30 and inner bearing surfaces 64. In this condition where the wave springs 40 are partially compressed in shown FIG. 7b, the outermost surface 34 of backup rings 30 come into physical contact with innermost ends 56 of the collapsible split ring annular gripping members 50.

Further tightening of nuts 74 onto bolts 72 causes further inward movement of said follower members 60 and causes the wave springs 40 to further compress and causes said backup rings 30 to collapse said gripping members thereby causing gripping teeth 52 to engage pipe ends 2 and 4. Prior to time when the gripping teeth 52 engage pipe ends 2 and 4 the tightening of nuts 74 continues to cause compression of gasket members 20. Once the gripping teeth 56 have fully engaged into the pipe ends 2 and 4, further compression of the gasket rings 20 is prevented, unless there is a separation between the pipe ends 2 and 4 and at least one of said pipe ends is free to move longitudinally. Once the coupling of the present invention is in a fully tightened condition as shown in FIG. 2, a compressed wave spring provides a source of stored energy to reduce torque would occur because of stress relaxation of at least one of the pipes and the gaskets over time.

The amount of stored energy provided by said wave springs may be precisely controlled by the selection of the metal from which such springs are fabricated as well as the thickness, number of layers, number of crests and valleys and the degree of sinusoidal deformation of such wave spring.

The use of a wave spring 40 in combination with the other components of the present invention, allows for the creation of a pipe coupling which is easy to install, which allows for the provision of a desired degree of gasket compression and gripping regardless of temperature conditions and also reduces undesired torque loss.

While I have described a present preferred embodiments of the invention, it is to be distinctly understood that the invention is not limited thereto but may be otherwise embodied and practiced within the scope of the following claims.

I claim:

1. A coupling for pipes comprising:
   (a) a central elongate sleeve having opposite flared ends, a longitudinal midpoint and adapted to receive coaxially two opposite pipe ends to be connected;
   (b) a pair of annular gasket members positioned within said opposite sleeve ends, said gasket members having longitudinal innermost gasket ends adapted to be received by the flared ends of said central sleeve and said gasket members having a longitudinal outermost end;
   (c) a pair of annular backup rings positioned longitudinally outwardly of said gasket members;
   (d) a pair of independent metal annular wave springs positioned longitudinally outwardly of said backup rings, said wave springs having a longitudinal innermost surface and a longitudinal outermost surface;

(e) a pair of collapsible split ring annular gripping members positioned longitudinally outwardly of said backup rings, said gripping members having gripping teeth on a circumferential inside surface thereof, said teeth adapted to engage said pipe ends when said gripping members are collapsed;

(f) a pair of follower members positioned longitudinally outwardly of said wave springs and gripping members, said follower members having longitudinal outer flange portions having substantially flat inner bearing surfaces; and (g) tightening means engaging said follower members for providing inward force on said follower members to urge said follower members relatively closer together and toward said longitudinal midpoint of said sleeve whereby, as force is applied, inward motion of the follower members initially causes force to be transferred from the follower members through said wave springs to the gaskets thereby causing partial gasket compression, thereafter causes said wave springs to compress in only a longitudinal direction and causes said backup rings to contact and collapse said gripping members and said gripping teeth to engage said pipe ends, whereby said compressed wave springs store energy to reduce torque loss of said tightening means caused by stress relaxation of said pipes or said gaskets.

2. A coupling according to claim 1 wherein said flared ends have a frusto-conical configuration and slope outwardly away from a circumferential centerline of said sleeve when moving longitudinally outwardly from said longitudinal midpoint of the sleeve.

3. A coupling according to claim 1 wherein said innermost gasket ends are frusto-conical and have circumferential outer surfaces which slope outwardly away from a circumferential centerline of said sleeve when moving outwardly from a longitudinal midpoint of the sleeve.

4. A coupling according to claim 1 wherein said innermost gasket ends have a V-shaped groove sized and positioned to receive and engage an outermost rim of said central sleeve.

5. A coupling according to claim 1 wherein said gasket members have substantially flat longitudinal outermost ends.

6. A coupling according to claim 1 wherein said backup rings have substantially flat longitudinal innermost ends and substantially flat longitudinal outermost ends.

7. A coupling according to claim 6 wherein said longitudinal outermost ends of said backup rings have a circumferential width including a circumferential outer portion and circumferential inner portion.

8. A coupling according to claim 1 wherein said wave springs having substantially sinusoidal innermost and outermost surfaces.

9. A coupling according to claim 1 wherein said gripping members have frusto-conical circumferential outer sides which slope inwardly toward a circumferential center line of said sleeve when moving outwardly from the longitudinal midpoint the sleeve.

10. A coupling according to claim 1 wherein said tightening means further comprises at least a pair of bolts extending through corresponding bore holes of said followers and at least a pair of nuts threaded on said bolts whereby tightening said bolts urges said follower members relatively closer together.

11. A coupling for pipes comprising:
(a) a central elongate sleeve having opposite flared ends, a longitudinal midpoint and adapted to receive coaxially two opposite pipe ends to be connected;

(b) a pair of annular gasket members positioned within said opposite sleeve ends, said gasket members having longitudinal innermost gasket ends adapted to be received by the flared ends of said central sleeve and said gasket members having a longitudinal outermost end;

(c) a pair of annular backup rings positioned longitudinally outwardly of said gasket members, said backup rings have substantially flat longitudinal innermost ends and substantially flat longitudinal outermost ends, said longitudinal innermost ends of said backup rings positioned adjacent to and in contact with the outermost ends of said gasket members;

(d) a pair of annular wave springs positioned longitudinally outwardly of said backup rings, said wave springs having a longitudinally innermost surface and a longitudinal outermost surface;

(e) a pair of collapsible split ring annular gripping members positioned longitudinally outwardly of said backup rings, said gripping members having gripping teeth on a circumferential inside surface thereof, said teeth adapted to engage said pipe ends when said gripping members are collapsed;

(f) a pair of follower members positioned longitudinally outwardly of said wave springs and gripping members, said follower members having longitudinal outer flange portions having substantially flat inner bearing surfaces; and (g) tightening means engaging said follower members for providing inward force on said follower members to urge said follower members relatively closer together and toward said longitudinal midpoint of said sleeve whereby, as force is applied, inward motion of the follower members initially causes partial gasket compression, thereafter causes said wave springs to compress and said backup rings to contact and collapse said gripping members and said gripping teeth to engage said pipe ends, whereby said compressed wave springs store energy to reduce torque loss of said tightening means caused by stress relaxation of said pipes or said gaskets.

12. A coupling for pipes comprising:
(a) a central elongate sleeve having opposite flared ends, a longitudinal midpoint and adapted to receive coaxially two opposite pipe ends to be connected;

(b) a pair of annular gasket members positioned within said opposite sleeve ends, said gasket members having longitudinal innermost gasket ends adapted to be received by the flared ends of said central sleeve and said gasket members having a longitudinal outermost end;

(c) a pair of annular backup rings positioned longitudinally outwardly of said gasket members, said backup rings having substantially flat longitudinal innermost ends and substantially flat longitudinal outermost ends, said longitudinal outermost ends of said backup rings having a circumferential width including a circumferential outer portion and circumferential inner portion;

(d) a pair of annular wave springs positioned longitudinally outwardly of said backup rings, said wave springs having a longitudinally innermost surface and a longitudinal outermost surface, said wave springs having a circumferential width less than the circumferential width of said backup rings;

(e) a pair of collapsible split ring annular gripping members positioned longitudinally outwardly of said backup rings, said gripping members having gripping teeth on a circumferential inside surface thereof, said teeth adapted to engage said pipe ends when said gripping members are collapsed;

(f) a pair of follower members positioned longitudinally outwardly of said wave springs and gripping members, said follower members having longitudinal outer flange portions having substantially flat inner bearing surfaces; and (g) tightening means engaging said follower members for providing inward force on said follower members to urge said follower members relatively closer together and toward said longitudinal midpoint of said sleeve whereby, as force is applied, inward motion of the follower members initially causes partial gasket compression, thereafter causes said wave springs to compress and said backup rings to contact and collapse said gripping members and said gripping teeth to engage said pipe ends, whereby said compressed wave springs store energy to reduce torque loss of said tightening means caused by stress relaxation of said pipes or said gaskets.

13. A coupling for pipes comprising:

(a) a central elongate sleeve having opposite flared ends, a longitudinal midpoint and adapted to receive coaxially two opposite pipe ends to be connected;

(b) a pair of annular gasket members positioned within said opposite sleeve ends, said gasket members having longitudinal innermost gasket ends adapted to be received by the flared ends of said central sleeve and said gasket members having a longitudinal outermost end;

(c) a pair of annular backup rings positioned longitudinally outwardly of said gasket members, said backup rings having substantially flat longitudinal innermost ends and substantially flat longitudinal outermost ends, said longitudinal outermost ends of said backup rings having a circumferential width including a circumferential outer portion and circumferential inner portion;

(d) a pair of annular wave springs positioned longitudinally outwardly of said backup rings, said wave springs having a longitudinal innermost surface and a longitudinal outermost surface, at least a portion of said innermost surfaces of said wave springs positioned adjacent to and in contact with said circumferential outer portions of said outermost ends of said backup rings;

(e) a pair of collapsible spit ring annular gripping members positioned longitudinally outwardly of said backup rings, said gripping members having gripping teeth on a circumferential inside surface thereof, said teeth adapted to engage said pipe ends when said gripping members are collapsed;

(f) a pair of follower members positioned longitudinally outwardly of said wave springs and gripping members, said follower members having longitudinal outer flange portions having substantially flat inner bearing surfaces; and (g) tightening means engaging said follower members for providing inward force on said follower members to urge said follower members relatively closer together and toward said longitudinal midpoint of said sleeve whereby, as force is applied, inward motion of the follower members initially causes partial gasket compression, thereafter causes said wave springs to compress and said backup rings to contact and collapse said gripping members and said gripping teeth to engage said pipe ends, whereby said compressed wave springs store energy to reduce torque loss of said tightening means caused by stress relaxation of said pipes or said gaskets.

14. A coupling for pipes comprising:

(a) a central elongate sleeve having opposite flared ends, a longitudinal midpoint and adapted to receive coaxially two opposite pipe ends to be connected;

(b) a pair of annular gasket members positioned within said opposite sleeve ends, said gasket members having longitudinal innermost gasket ends adapted to be received by the flared ends of said central sleeve and said gasket members having a longitudinal outermost end;

(c) a pair of annular backup rings positioned longitudinally outwardly of said gasket members, said backup rings having substantially flat longitudinal innermost ends and substantially flat longitudinal outermost ends, said longitudinal outermost ends of said backup rings having a circumferential width including a circumferential outer portion and circumferential inner portion;

(d) a pair of annular wave springs positioned longitudinally outwardly of said backup rings, said wave springs having a longitudinal innermost surface and a longitudinal outermost surface;

(e) a pair of collapsible split ring annular gripping members positioned longitudinally outwardly of said backup rings, said gripping members having gripping teeth on a circumferential inside surface thereof, said teeth adapted to engage said pipe ends when said gripping members are collapsed, said annular gripping members also having longitudinal inward ends initially spaced from and facing said circumferential inner portions of said outermost ends of said backup rings;

(f) a pair of follower members positioned longitudinally outwardly of said wave springs and gripping members, said follower members having longitudinal outer flange portions having substantially flat inner bearing surfaces; and (g) tightening means engaging said follower members for providing inward force on said follower members to urge said follower members relatively closer together and toward said longitudinal midpoint of said sleeve whereby, as force is applied, inward motion of the follower members initially causes partial gasket compression, thereafter causes said wave springs to compress and said backup rings to contact and collapse said gripping members and said gripping teeth to engage said pipe ends, whereby said compressed wave springs store energy to reduce torque loss of said tightening means caused by stress relaxation of said pipes or said gaskets.

15. A coupling for pipes comprising:
(a) a central elongate sleeve having opposite flared ends, a longitudinal midpoint and adapted to received coaxially two opposite pipe ends to be connected;
(b) a pair of annular gasket members positions within said opposite sleeve ends, said gasket members having longitudinal innermost gasket ends adapted to be received by the flared ends of said central sleeve and said gasket members having a longitudinal outermost end;
(c) a pair of annular backup rings positioned longitudinally outwardly of said gasket members;
(d) a pair of annular wave springs positioned longitudinally outwardly of said backup rings, said wave springs having a longitudinal innermost surface and a longitudinal outermost surface;
(e) a pair of collapsible split ring annular gripping members positioned longitudinally outwardly of said backup rings, said gripping members having gripping teeth on a circumferential inside surface thereof, said teeth adapted to engage said pipe ends when said gripping members are collapsed;
(f) a pair of follower members positioned longitudinally outwardly of said wave springs and gripping members, said follower members having longitudinal outer flange portions which provide substantially flat inner bearing surfaces, said inner bearing surfaces being in at least partial contact with outermost surfaces of said wave springs, said flange portions of said follower members having a frusto-conical opening therethrough positioned circumferentially inwardly of said inner bearing surfaces, said frusto-conical openings having a surface sloping inwardly toward a circumferential center line of the sleeve when moving outwardly from a longitudinal midpoint of the sleeve; and
(g) tightening means engaging said follower members for providing inward force on said follower members to urge said follower members relatively closer together and toward said longitudinal midpoint of said sleeve whereby, as force is applied, inward motion of the follower members initially causes partial gasket compression, thereafter causes said wave springs to compress and said backup rings to contact and collapse said gripping members and said gripping teeth to engage said pipe ends, whereby said compressed wave springs store energy to reduce torque loss of said tightening means caused by stress relaxation of said pipes or said gaskets.

* * * * *

UNITED STATES PATENT AND TRADEMARK OFFICE
CERTIFICATE OF CORRECTION

PATENT NO. : 5,069,490

DATED : December 3, 1991

INVENTOR(S) : Richard M. Halen, Jr.

It is certified that error appears in the above-identified patent and that said Letters Patent is hereby corrected as shown below:

Column 1 line 7, after "seal" insert --.--.

Column 1 line 22, after "actuated" insert --.--.

Column 1 line 29, after "coupling" insert --.--.

Column 1 line 31, after "possible" insert --.--.

Column 1 line 35, after "gasket" insert --.--.

Column 1 line 43, after "seal" insert --.--.

Column 1 line 62, after "time" insert --.--.

Column 1 line 67, after "time" insert --.--.

Column 2 line 2, after "later" insert --.--.

Column 2 line 21, after "conditions" insert --.--.

Column 2 line 24, after "time" insert --.--.

Column 3 line 48, after "surfaces" insert --.--.

UNITED STATES PATENT AND TRADEMARK OFFICE
CERTIFICATE OF CORRECTION

PATENT NO. : 5,069,490

DATED : December 3, 1991

INVENTOR(S) : Richard M. Halen, Jr.

It is certified that error appears in the above-identified patent and that said Letters Patent is hereby corrected as shown below:

Column 4 line 52, change "ar" to --are--.

Column 6 line 32, after "torque" insert -- loss which otherwise--.

Column 9 line 5, change "longitudinally" to --longitudinal--.

Column 11 line 6, change "ceived" to --ceive--.

Column 11 line 8, change "positions" to --positioned--.

Signed and Sealed this

Sixth Day of July, 1993

*Attest:*

MICHAEL K. KIRK

*Attesting Officer*   Acting Commissioner of Patents and Trademarks